United States Patent
Betz

(10) Patent No.: US 6,732,633 B1
(45) Date of Patent: May 11, 2004

(54) REDUCED DEAD VOLUME HOLLOW PISTON

(75) Inventor: Michael A. Betz, Huxley, IA (US)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 10/341,708

(22) Filed: Jan. 14, 2003

(51) Int. Cl.$^7$ .................................. F16J 1/00
(52) U.S. Cl. .................... 92/172; 92/181 R; 92/188
(58) Field of Search .................. 92/157, 172, 176, 92/181 R, 182, 187, 188, 153

(56) References Cited

U.S. PATENT DOCUMENTS

| | | | |
|---|---|---|---|
| 3,636,821 A | 1/1972 | Rystrom | |
| 4,745,846 A | 5/1988 | Eickmann | |
| 5,216,943 A | * 6/1993 | Adler et al. | 92/157 |
| 5,469,776 A | * 11/1995 | Martensen et al. | 92/187 |
| 5,490,446 A | 2/1996 | Engel | |
| 5,970,845 A | * 10/1999 | Beck | 92/172 |
| 6,016,739 A | * 1/2000 | Baehler | 92/172 |
| 6,237,467 B1 | * 5/2001 | Beck | 92/157 |
| 6,293,185 B1 | 9/2001 | Stoppek et al. | |
| 6,338,293 B1 | 1/2002 | Johnson et al. | |
| 6,431,051 B1 | 8/2002 | Stoppek et al. | |
| 6,470,791 B1 | * 10/2002 | Welter et al. | 92/188 |
| 6,662,709 B1 | * 12/2003 | Beutler | 92/176 |
| 2002/0096047 A1 | 7/2002 | Stoppek | |
| 2002/0144592 A1 | 10/2002 | Forster | |

FOREIGN PATENT DOCUMENTS

DE    198 54 415 A1    11/1998

* cited by examiner

Primary Examiner—Thomas E. Lazo

(57) ABSTRACT

A piston for use in the cylinder block of a hydraulic power unit. The piston has an elongated cylindrical body with one end configured to connect with a slipper element. The second end of the piston is open with an annular cavity in the piston body defining an elongated stem extending from the head end of the piston and slightly protruding through the open end. The stem is concentrically located within the longitudinal axis of the annular cavity and has an elongated fluid conduit that extends longitudinally through the stem and completely through the piston. The fluid conduit traverses the piston body along the center axis, providing a path for pressurized fluid. The piston is composed of a unitary cast construction.

4 Claims, 2 Drawing Sheets

REDUCED DEAD VOLUME HOLLOW PISTON

BACKGROUND OF THE INVENTION

Figure 1:
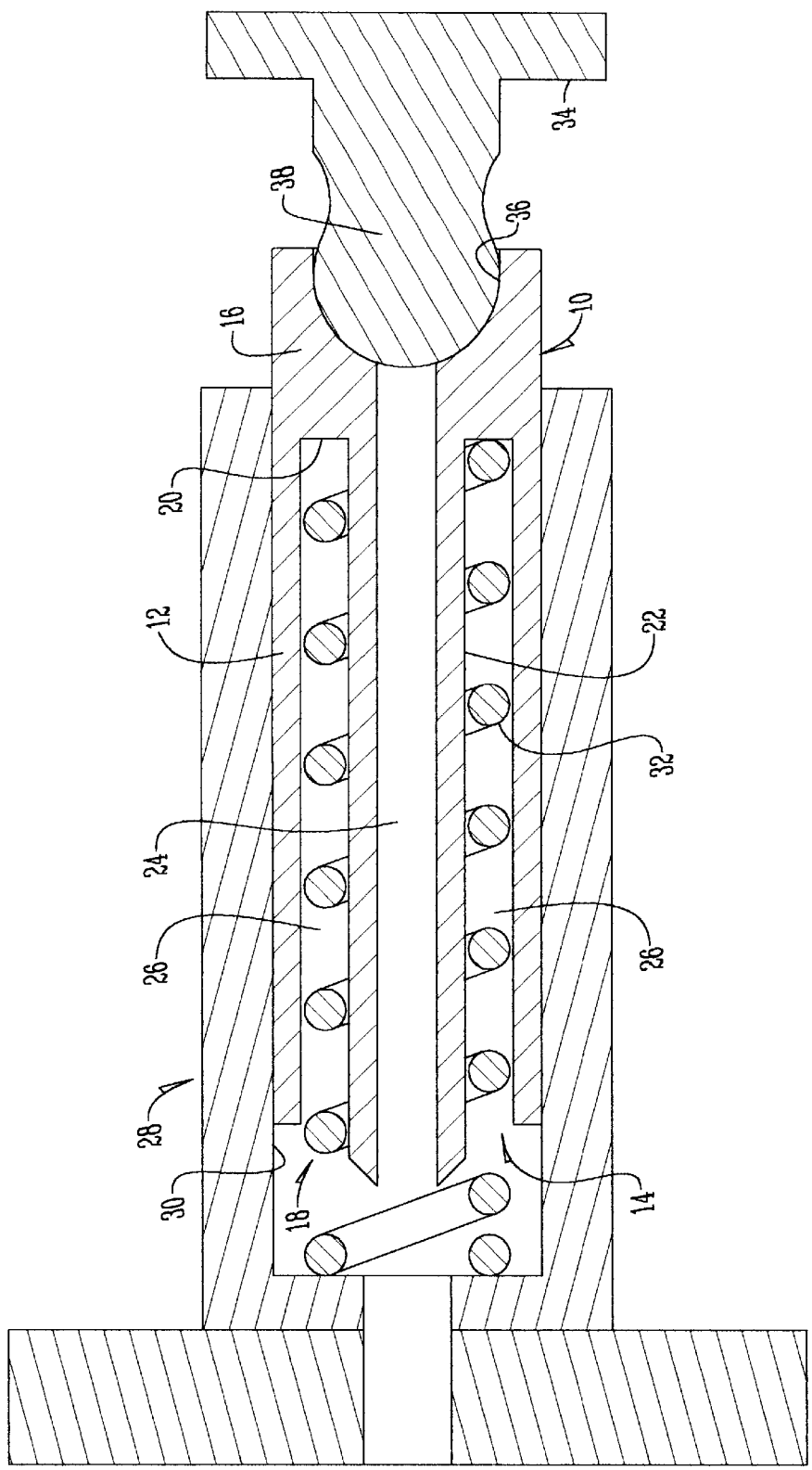

This invention relates to hydraulic power units of the type that incorporate a cylinder block containing reciprocating pistons that are in operational engagement with a swashplate through pivotally attached slippers. Such hydraulic power units may operate as either pumps or motors. Specifically, this invention is concerned with an improved piston for use in such hydraulic power units.

Typically, the pistons that are utilized in hydraulic power units of the aforementioned type have been manufactured from a composition of metallic components, usually steel, secured together to form a solid piston. Such pistons typically have a closed or solid end opposite the end that engages the slipper and the swashplate. Closed end pistons are shown in U.S. Pat. No 3,319,575 and in U.S. Pat. No. 6,293,185. Such pistons typically have a fluid conduit through a center bore that traverses the central axis of the piston. Fluid conduits extending the length of the piston are shown in U.S. Pat. No 3,319,575, U.S. Pat. No. 3,882,762, and in U.S. Pat. No. 6,293,185.

It is desirable in a hydrostatic motor or pump to reduce the amount of "dead volume" in the piston bore. "Dead volume" is the volume of oil in a piston bore that converts mechanical energy to fluid energy. The amount of energy loss can become very high at high pressures. "Dead volume" also has a negative effect on the variability of swashplate forces that are transferred to the swashplate from the piston/slipper assembly. The lower the amount of "dead volume" the lower the variability of the swashplate forces. It is desirable to reduce the swashplate force variability in order to optimize the controllability of the entire hydrostatic unit. Reducing the "dead volume" can be achieved in other ways, but these are generally costly alternatives. It is desirable to reduce the dead volume for the least amount of cost.

It is preferable for the interior of a piston to have an open cavity and a fluid conduit. Such cavity and fluid conduits have typically been created by the geometry of the component parts that are joined to form the piston. It is advantageous for the hollow cavity and fluid conduit to be formed in a single process and it is further advantageous for the piston to be of a solid unitary construction.

Therefore, it is a principal objective of this invention to provide a piston with a stem that reduces dead volume in the bore.

A further object of this invention is to provide a piston with a stem that reduces the dead volume in the bore that is economical of manufacture.

BRIEF SUMMARY OF THE INVENTION

A piston for a cylinder block of a hydraulic power unit has a cylinder body with an open end and a closed end terminating in a surface configured to receive a slipper to engage a swashplate. The piston body is in the form of a hollow cylinder with a hollow stem located at its core. The connection between the piston and the slipper to the swashplate may take the form of either an external ball on the piston to be received by a corresponding socket on the slipper, or a socket on the piston to receive a corresponding ball on the slipper. The piston is held against the slipper to the swashplate by force from an internally mounted spring. The piston incorporates a fluid conduit through a stem in the piston, which provides a path for pressurized fluid to flow. The stem effectively fills much of the dead space within the piston.

The piston is created of a unitary construction, preferably from casting.

BRIEF DESCRIPTION OF THE DRAWINGS AND PHOTOS

Figure 2:
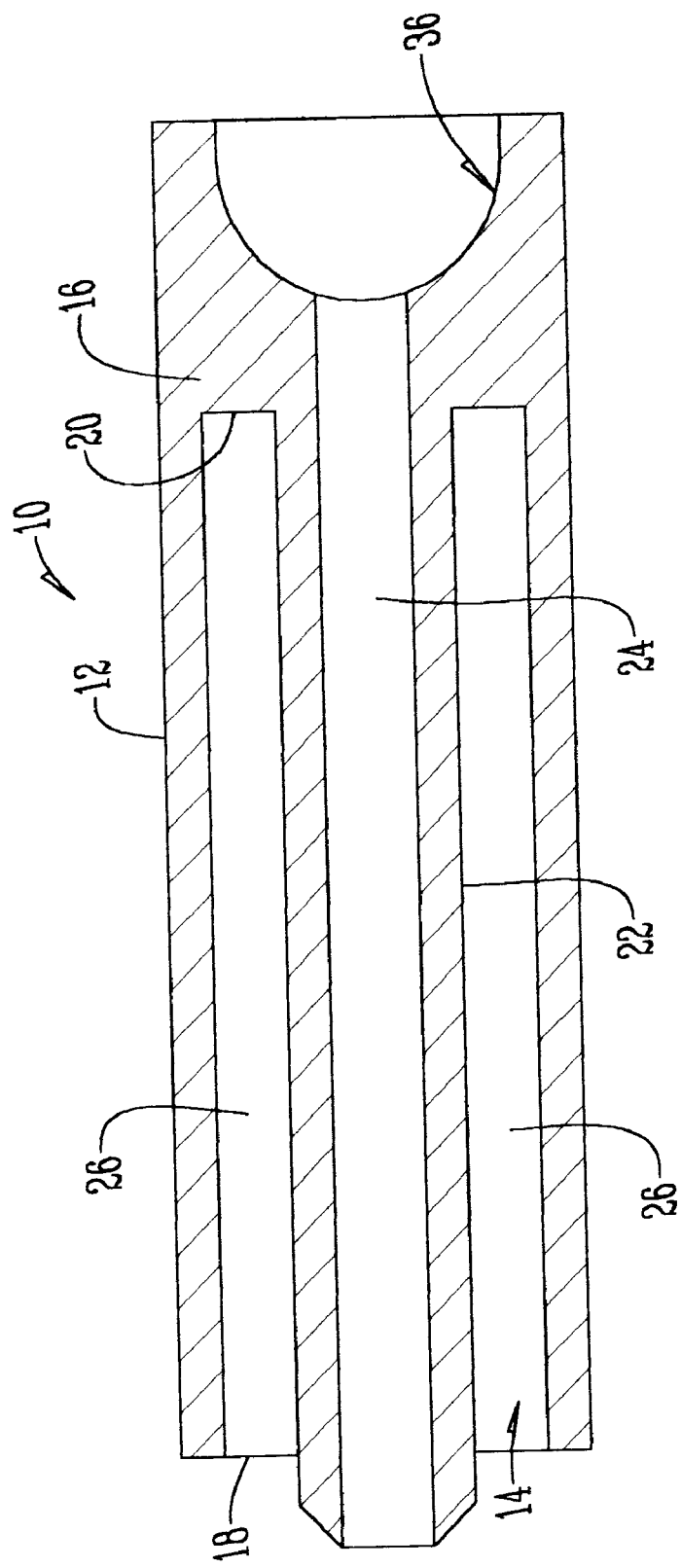

FIG. 1 is a longitudinal sectional view of the piston; and
FIG. 2 is a longitudinal sectional view of the piston of FIG. 1.

DESCRIPTION OF THE PREFERRED EMBODIMENTS

With reference to FIGS. 1 and 2, corresponding elements have been identified with like numerals and/or sequential letter designations to facilitate understanding of the various invention embodiments that have been contemplated.

The numeral 10 designates a piston that has a cylindrical body 12 and a center bore 14, a head end 16 and an open end 18. The center bore 14 terminates at 20 in the head end 16. An elongated stem 22 extends from the head end 16 and slightly protrudes through the open end 18. The stem 22 is concentrically located within the longitudinal axis of the center bore 14. Stem 22 is hollow and an elongated fluid conduit 24 extends along the center axis thereof and completely through the piston 10. An annular cavity 26 (being a part of the center bore 14) extends around stem 22 and defines the space between the outer surface of the stem and the interior surface of the bore. The annular cavity 26 extends from open end 18 to the inner terminal end 20 of the center bore 14.

Piston 10 is slidably associated with a conventional piston block 28, which has a cylindrical bore 30 to receive piston 10. Slidably located within annular cavity 26 is a spring element 32.

The head end 16 is configured to be operatively connected to a slipper 34, which allows rotary and pivotal freedom of motion between the piston and a conventional swashplate (not shown). In one embodiment, the head end 16 may be configured as a socket 36 that is sized to receive a ball-shaped connection 38 of the slipper 34. In an alternate embodiment (not shown), the head end 16 may be configured as a partial sphere which is sized to be operatively received by a socket on a slipper element. It can be clearly understood that all of the aforementioned features and characteristics are applicable to these variations as well.

The casting of the piston 10 is made possible by a casting process known in the industry as Metal Injection Molding (MIM). The casting of the structure of this invention was not feasible with conventional casting techniques that preceded MIM, and machining of the piston of this invention would involve increased manufacturing expense.

The piston described herein provides a stem with an annular space therearound that substantially reduces the dead volume in the piston. It also is economical to manufacture.

Therefore, it can be seen that the invention accomplishes as its stated objectives.

What is claimed is:
1. A hollow piston, comprising, an elongated hollow piston body having a center bore
   extending completely along a center axis of the piston body;
   the piston body having a first closed end configured to connect with a slipper element, and an open second end;

an elongated stem in the center bore extending from the closed end and past the open end of the piston body;

an annular cavity in the piston body around the stem; and an elongated fluid conduit extending longitudinally completely through the stem and the piston body.

2. The piston of claim 1 wherein the piston is of unitary cast construction.

3. A hollow piston, comprising:

an elongated piston body having a center bore extending along a center axis of the piston body with a first closed end and a second opened end;

an elongated stem within the center bore such that the center bore forms an annular cavity around the stem; and said stem having an elongated fluid conduit extending longitudinally therethrough.

4. The hollow piston of claim 3 wherein the first closed end has a receiving means for swivelably receiving a slipper element.

* * * * *